United States Patent [19]
Porter, Jr. et al.

[11] 3,949,951
[45] Apr. 13, 1976

[54] TAPE CARTRIDGE DRIVE

[75] Inventors: Townsend Henry Porter, Jr.; Robert Ellsworth Schopp, both of Rochester, Minn.

[73] Assignee: International Business Machines Corporation, Armonk, N.Y.

[22] Filed: Dec. 17, 1974

[21] Appl. No.: 533,735

[52] U.S. Cl.................................. 242/192; 242/208
[51] Int. Cl.².................... G03B 1/04; G11B 15/32
[58] Field of Search............ 242/180, 192, 197–202, 242/208–210; 360/74

[56] References Cited
UNITED STATES PATENTS

| | | | |
|---|---|---|---|
| 3,130,975 | 4/1964 | Proctor | 242/192 |
| 3,499,619 | 3/1970 | Newell | 242/192 |
| 3,593,946 | 7/1971 | Shardlow | 242/192 |
| 3,662,970 | 8/1970 | Hoffman | 242/180 |
| 3,692,255 | 9/1972 | Von Behren | 242/192 |

Primary Examiner—Leonard D. Christian
Attorney, Agent, or Firm—Keith T. Bleuer

[57] ABSTRACT

A machine for holding a tape cartridge and including propelling means for driving the tape through the cartridge in both directions. The machine has a cartridge receiving slot with a drive roll at the bottom of the slot disposed on a rotatable drive member carried by a swingable member. A pair of drive rolls are driven from an electric motor and are disposed with respect to the swingable member so that, when the swingable member is swung in opposite directions, the drive rolls drive the rotatable drive member in opposite directions for thereby driving the tape in opposite directions. A pair of swing arms are on opposite sides of and are both effective on the rotatable drive member in a neutral position of the swingable member for braking the drive roll at the bottom of the slot. The swing arms are moved out of braking engagement with the rotatable drive member when the swingable member is moved to bring the rotatable drive member into driven relationship with respect to said pair of drive rolls.

11 Claims, 10 Drawing Figures

TAPE CARTRIDGE DRIVE

BACKGROUND OF THE INVENTION

The invention relates to magnetic tapes and more particularly to a machine for receiving a tape cartridge and for driving the tape within the cartridge in one direction or the other.

Cartridge tape drives have previously been proposed for receiving cartridges and for driving the tapes through the cartridges in opposite directions. No particular mechanical braking means have been provided for braking the tape for preventing large gaps between successive recorded blocks of information on the tape, and instead relatively expensive electrically controlled means has been provided for temporarily reversing the torque in the drive motor for stopping the tape.

SUMMARY OF THE INVENTION

It is an object of the present invention to provide a machine for receiving a magnetic tape cartridge and for driving the tape in opposite directions through the cartridge and across a read/write magnetic head, with relatively inexpensive mechanical braking means being provided effective for braking the tape to a stop when the drive for the tape ceases.

More particularly, it is an object of the present invention to provide a drive roll which propels a ape through a cartridge and which is driven by a rotatable member disposed on a swingable member, with the rotatable member being engageable with oppositely rotating drive rolls depending on the direction in which the swingable member is moved and with mechanical braking means being effective on the rotatable member in the neutral position of the swingable member so that the tape is braked to a rapid stop when the swingable member is moved into a neutral position.

DESCRIPTION OF THE PREFERRED EMBODIMENT

Figure 1:
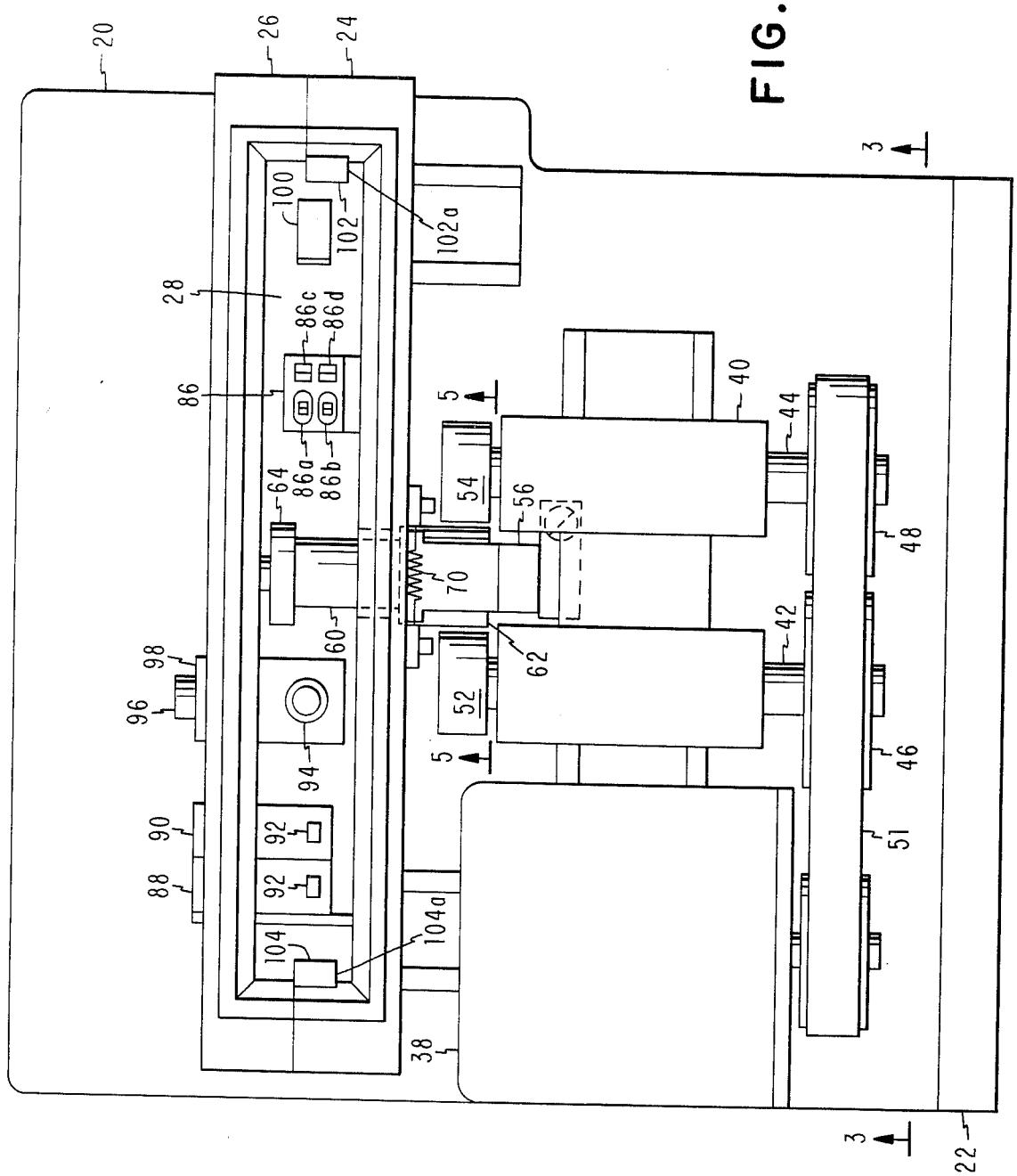
FIG. 1 is a plan view of the magnetic tape reading and writing machine of the invention.

Referring to FIGS. 1-5, the tape reading and writing machine illustrated therein may be seen to comprise a base 20, a base 22, a standard 24 and an elongate casing part 26 which are fixed together and together form a machine frame. The bases 20 and 22 are fixed at right angles to each other. The machine is shown with the base 20 horizontal; however, the machine is also useable with the base 22 disposed horizontally, as will be more fully described hereinafter. The standard 24 is fixed with respect to the base 20, and the casing part 26 is fixed with respect to the standard 24. The standard 24 and part 26 are so formed that they provide an elongate slot 28 between them into which a magnetic tape cartridge 30 may be inserted. The standard 24 carries a pair of spring pressed rolls 32 for holding the cartridge 30 in contact with reference surfaces within the slot 28. The rolls 32 are rotatably disposed on the ends of leaf springs 33. The standard 24 also carries another pair of spring pressed rolls 34 acting as detents for holding the cartridge 30 in fully inserted position within the slot 28. The rolls 34 are on the leaf springs 35. A pair of oppositely disposed cartridge stops 36 are disposed on the standard 24.

An electric motor 38 and a journal member 40 are fixed to the base 20. A pair of shafts 42 and 44 are rotatably disposed in the journal member 40, and a pair of pulleys 46 and 48 are respectively fixed to the shafts 42 and 44. A pulley 50 is fixed to the output shaft of the motor 38, and an endless belt 51 extends around the pulleys 46, 48 and 50 in the manner shown in FIG. 3. Drive rolls 52 and 54 are fixed respectively on the ends of the shafts 42 and 44 remote from the pulleys 46 and 48 as is shown in FIG. 1.

A gatelike member 56 is swingably mounted on the base 20, by means of a pivot shaft 57 located close to the base 20 and a shaft 58 extends through the member 56 remote from the base 20 and shaft 57. A cylindrical driving member 60 is rotatably disposed on the shaft 58 and has a drive roll portion 62 of enlarged diameter formed on one end. It will be noted from FIG. 1 in particular that the drive roll portion 62 is located between the rolls 52 and 54. A roll 64 of rubberlike material is bonded on the other end of the member 60 so that the roll 64 is at the end of the slot 28.

Figure 5:
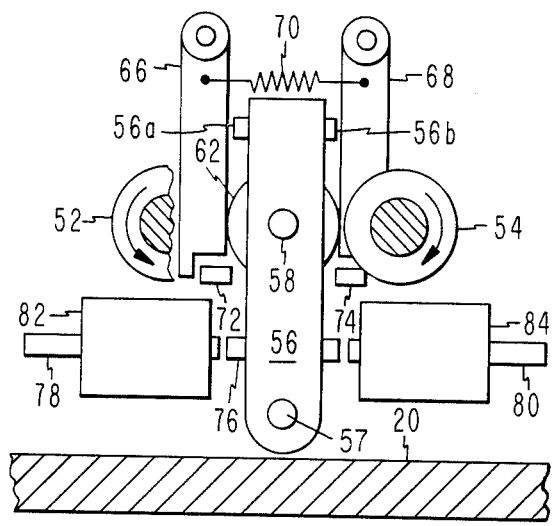
FIG. 5 is a sectional view taken on line 5—5 of FIG. 1.

A pair of arms 66 and 68 are swingably mounted on the outer surface of the standard 24 in such positions that they may have bearing contact with the roll portion 62 (see FIG. 5). A spring 70 connects the arms 66 and 68 adjacent their pivoted ends, and stops 72 and 74 are fixed to the outer surface of the standard 24 in such positions as to limit the movement of the arms 66 and 68 toward each other. The swinging member 56 is provided with abutment portions 56a and 56b which are adapted to contact the arms 66 and 68 on swinging movement of the member 56 as will hereinafter be described in greater detail.

The swinging member 56 is provided with a metal armature 76 extending therethrough, and the ends of the armature 76 are adjacent the cores 78 and 80 of electromagnets 82 and 84 that are fixed with respect to the base 20.

A magnetic read/write head 86 is fixed to the standard 24 and lies at the bottom of the slot 28 on one side of the cylindrical member 60. The head 86 includes two magnetic read/write elements 86a and 86b and two magnetic tape erase elements 86c and 86d. A pair of electric switches 88 and 90 each having a switch actuating plunger 92 are carried by the standard 24 and are disposed at the bottom of the slot 28. A phototransistor 94 is located at the bottom of the slot 28 and is aimed to be subject to light being transmitted in the direction of the slot 28, and a corresponding light source 96 is provided at the side of the slot 28 and projects light at right angles to the slot 28. The phototransistor and light source 96 are carried by a standard 98 fixed with respect to the base 20. A gate guide member 100 is fixed to the base 20, and the standard 24 is provided with a gate actuating projection 102 in the slot 28. Another projection 104 is provided in the slot 28 opposite the projection 102, and these projections function to guide and properly position the cartridge 30 as will be described.

Figure 6:
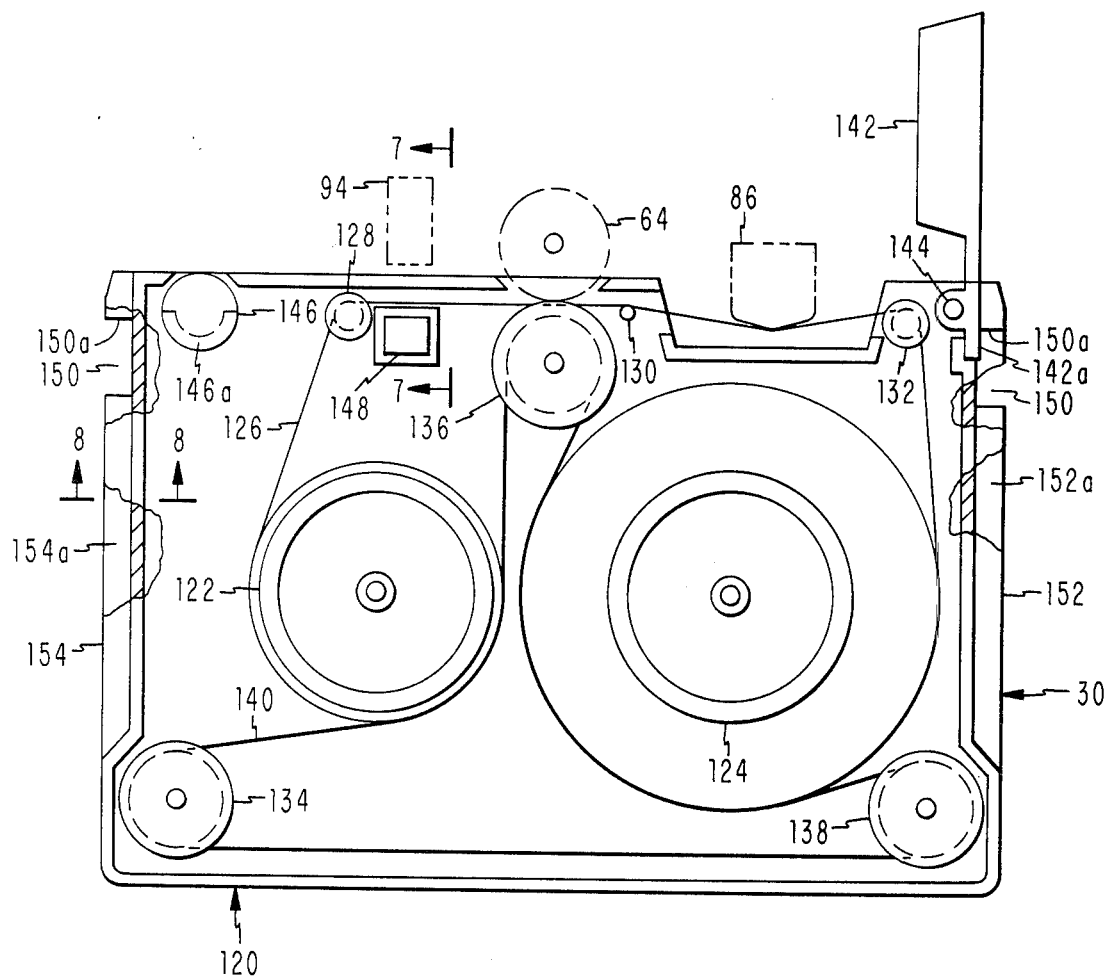
FIG. 6 is a plan view of a tape cassette useable with the machine illustrated in FIGS. 1-5.

Referring to FIG. 6, the cartridge 30 may be seen to comprise a casing 120 having a pair of reels 122 and 124 rotatably disposed therein. The reels carry a length of magnetic tape 126, extending from one of the reels to the other and wound on both of the reels; and the tape also extends over fixed guides 128, 130 and 132. When the cartridge is properly positioned within the slot 28, the read/write head 86 is positioned between the guides 130 and 132 and depresses the magnetic tape 126 as supported by these guides as shown in FIG. 6. Rollers 134, 136 and 138 are rotatably disposed within the casing 120, and an endless belt 140 extends over these rollers and also over the tape 126 wound on the reels 122 and 124. The roller 136 is so positioned that it makes contact with the roll 64 when the cartridge 30 is in proper position within the slot 28.

Figures 7, 8:
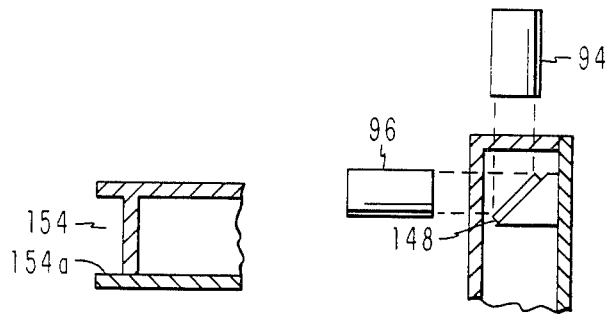
FIGS. 7 and 8 are sectional views taken on lines 7—7 and 8—8, respectively, of FIG. 6.

A magnetic tape shield 142 is swingably mounted at a corner of the casing 120 by means of a pin 144, and a suitable spring (not shown) extends around the pin 144 for swinging the shield 142 so that it covers the portion of the magnetic tape extending between the guides 130 and 132. The shield 142 has an elongate end 142a by means of which the shield is swung outwardly against the action of the spring, as will be described. A tubular element 146 is rotatably adjustably mounted in the casing 120 and has a peripheral portion 146a for abutting against the plunger 92 of the switch 88 for actuating the switch 88. The switch 88 may be connected with the electrical circuitry for the head 86 so that the head 86 cannot erase any magnetically encoded information on the tape 126 when the element 146 is in its adjusted position to have the portion 146a operative on the switch 88 with the cartridge 30 being in its working position in the slot 28. The plunger 92 of the switch 90 is engaged by a side edge portion of the casing 120 so that the switch 90 may be used in connection with the electrical circuitry for the head 86 for indicating that the cartridge 30 is actually in proper position in the slot 28. A mirror 148 is mounted in the casing 120 at 45 degrees with respect to the side edge of the casing 120 as shown in FIG. 7, and it is contemplated that the casing 120 shall be of transparent material so that the light source 96 can be effective to shine a beam of light on the mirror 148 to be reflected therefrom to the phototransistor 94, assuming that there are holes through the tape 126 indicative of an approaching end of the tape 126. The casing 120 is provided with slots 150 on its sides into which the spring pressed rolls 34 may register and is provided with slots 152 and 154 on its ends for receiving the projections 102 and 104.

In order to put the machine into operation, the cartridge 30 is moved downwardly into the slot 28 with the shield 142 being down and on the right edge of the slot 28 as the slot 28 is seen in FIG. 1. The elongate end 142a of the shield 142 strikes the projection 102 at the side of the slot 28, and the projection 102 thus rotates the shield 142 so that it extends outwardly with respect to the casing 20 in the direction illustrated in FIG. 6. The cartridge 30 is pushed still farther down into the slot 28; and, during this movement and also when the cartridge 30 is fully positioned within the slot 28, the spring pressed rolls 32 act on the cartridge 30 and hold the slot defining surfaces 152a and 154a against the surfaces 102a and 104a of the projections 102 and 104. The surfaces 102a and 104a thus act as reference surfaces for holding the cartridge 30 properly positioned transversely in the slot 28.

Eventually, during this downward movement of the cartridge 30 in the slot 28, the spring pressed rolls 34 enter the slots 150 on the sides of the casing 120; and shortly thereafter the roller 136 makes contact with the roll 64. The roll 64 prevents any additional downward movement of the cartridge 30 in the slot 28 and in effect acts as a stop for the cartridge 30. The stops 36 are ordinarily not contacted by the cartridge 30 in its downward movement in the slot 28 and act only as stopping means for preventing undue downward movement of the cartridge 30 in the slot 28 which could be caused by excessive downward manual force exerted on the cartridge 30.

When the cartridge 30 is in its final working position in the slot 28, with the roll 136 contacting the roll 64, the spring pressed rolls 34 act on the edges 150a of the slots 150 and exert a continuing force on the cartridge 30 in the downward direction, firmly holding the roller 30 against the roll 64 even though the roll 64 may have a translational movement accompanying the swinging movement of the supporting member 56 for the roll 64. The spring pressed rolls 34 acting on the edges of the slots 150a thus provide a floating action of the cartridge 30 on the roll 64 having this translational movement, maintaining a firm driving engagement of the roller 136 with the roll 64. The spring pressed rolls 34 acting on the slot edges 150a also function as detent means for yieldably holding the cartridge in the slot 28 until a predetermined force is applied to the cartridge to pull it upwardly out of the slot 28 and rolls 34 also help rolls 32 in holding cartridge 30 in a registered position.

When the cartridge 30 is in its working position in the slot 28, with the roller 136 bearing on the roll 64, the magnetic head 86 depresses the magnetic tape 126 so that the tape 126 is in bowed condition between the guides 130 and 132 (see FIG. 6).

It may be assumed that the motor 38 is in operation, and the shafts 42 and 44 are thus driven by the belt 51. The directions of drive of the shafts 42 and 44 are in the opposite directions, shaft 42 being driven in the direction A and shaft 44 being driven in the direction B. It may be assumed initially that the swingable member 56 is in its neutral position as seen in FIG. 5, with both of the electromagnets 82 and 84 being de-energized. The arms 66 and 68 under the action of the spring 70 bear against and brake the rotatable driving member 60 by means of its roll portion 62. Under these conditions, the drive roll portion 62 of the rotatable member 60 is out of engagement with both of the drive rolls 52 and 54 so that the member 60 and the roll 64 are stationary.

Assuming it is desired to drive the magnetic tape 126 in a so-called "forward" direction, from the reel 124 to the reel 122, the electromagnet 82 is energized. Energization of the magnet 82 causes the member 56 to swing about its lower pivotal mounting with respect to the base 20, the swinging movement of the member 56 being in the counterclockwise direction as seen in FIG. 5. The drive roll portion 62 of the rotatable member 60 carried by the swingable member 56 is thus brought into friction driving relationship with respect to the roll 52. The roll 52 is driven from the shaft 42 and thus rotates the member 60 and its roll 64, and the roll 64 in rotating drives the roller 136 of the cartridge 30. The roll 64 along with the swinging movement of the member 56 does move so that its center moves out of a direct vertical from the center of the roller 136; however, the roll 64 remains in driving relationship with respect to the roller 136, due to the action of the spring pressed rolls 34 on the edges 150a of the slots 150.

With roller 136 being thus driven, the belt 140 is given a corresponding movement around the rollers 136, 134 and 138 and in bearing on the exterior surfaces of the rolls of tape 126 on the reels 124 and 122 causes the tape 126 to be drawn onto the reel 122 and off of the reel 124, all the time passing over the read/write head 86. The tape 126 may, during this movement, be encoded magnetically using the head 86 or previously encoded information on the tape 126 may be read using the head 86. The swinging movement of the member 56 in the counterclockwise direction due to the action of the electromagnet 82 causes the arm 66 to be moved out of engagement with the roll portion 62, the arm 66 being moved against the action of the spring 70 by means of the projection 56a on the swinging member 56. The arm 68 is prevented from moving to the left as seen in FIG. 5 due to the action of the stop 74. Thus, the swinging movement of the member 56 in the counterclockwise direction as seen in FIG. 5 has the action of disengaging the arms 66 and 68 with respect to the roll portion 62, so that the arms 66 and 68 do not have any braking action on the rotatable member 60 at this time.

When it is desired to stop this movement of the magnetic tape 126, the electromagnet 82 is de-energized. The swinging member 56 and arms 66 and 68 then return to their FIG. 5 neutral positions by action of spring 70. In these positions, the arms 66 and 68 bear against the roll portion 62 under the action of the spring 70 and act as braking members with respect to the roll portion 62 and the rotatable member 60. Since the rotatable member 60 is braked, the roller 136 and tape 126 are likewise braked. Thus, as soon as the electromagnet 82 is de-energized, the arms 66 and 68 move to neutral, braking positions with respect to the rotatable member 60; and the movement of the tape 126 is rapidly stopped.

When it is desired that the tape 126 shall move in a reverse direction, from left to right as seen in FIG. 6, the electromagnet 84 is energized. The electromagnet 84 functions to swing the arm 56 in a clockwise direction as seen in FIG. 5, and the drive roll portion 62 of the rotatable member 60 is brought into frictional driving relationship with respect to the drive roll 54. The arms 66 and 68 are disengaged with respect to the drive roll portion 62 similarly as in the case in which the member 56 was swung in the counterclockwise direction under the action of the magnet 82. The drive roll 54, rotating in the opposite direction with respect to the drive roll 52, drives the member 60 in the opposite direction; and the tape 126 is moved in the reverse direction under the driving action of the roll 64, the roller 136 and the belt 140. The reverse movement of the tape 126 is generally used for returning the tape 126 to an original position, prior to recording, so that a reading action may take place using the head 86 for checking previously encoded information on the tape.

Figure 2:
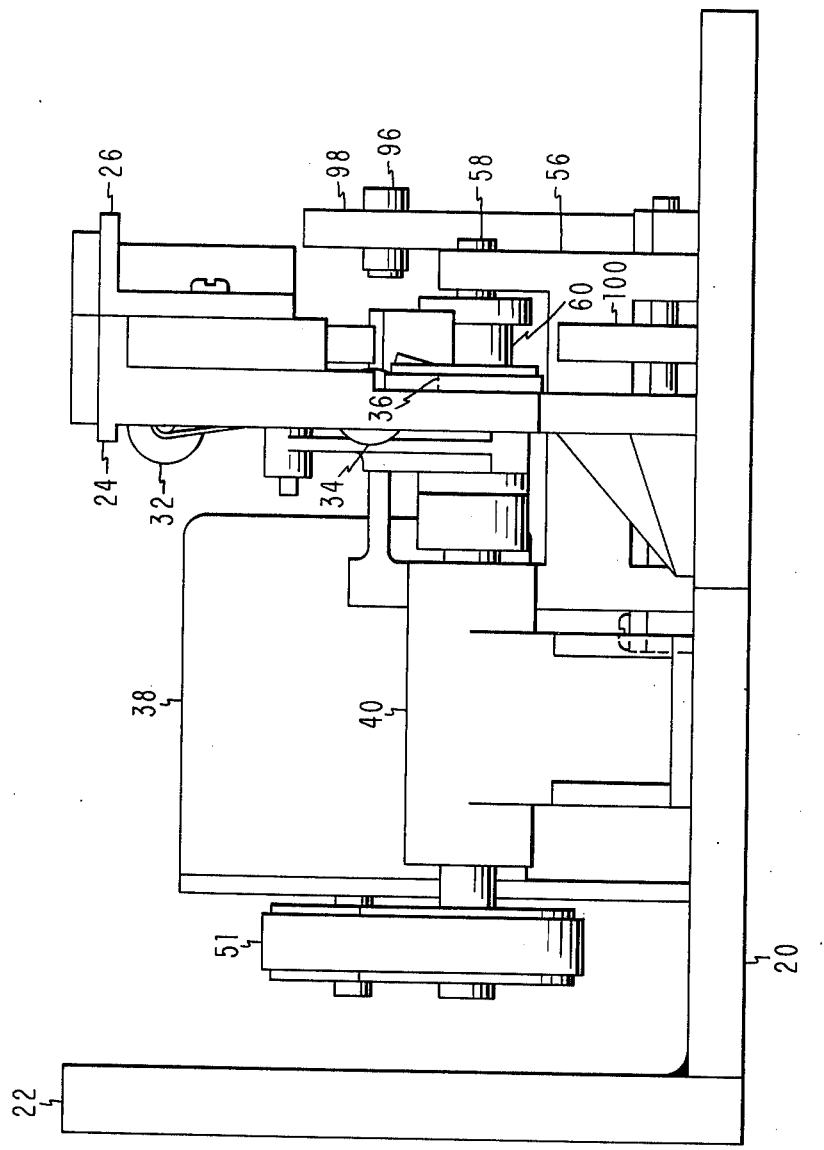
FIG. 2 is a side elevational view of the machine.
Figure 3:
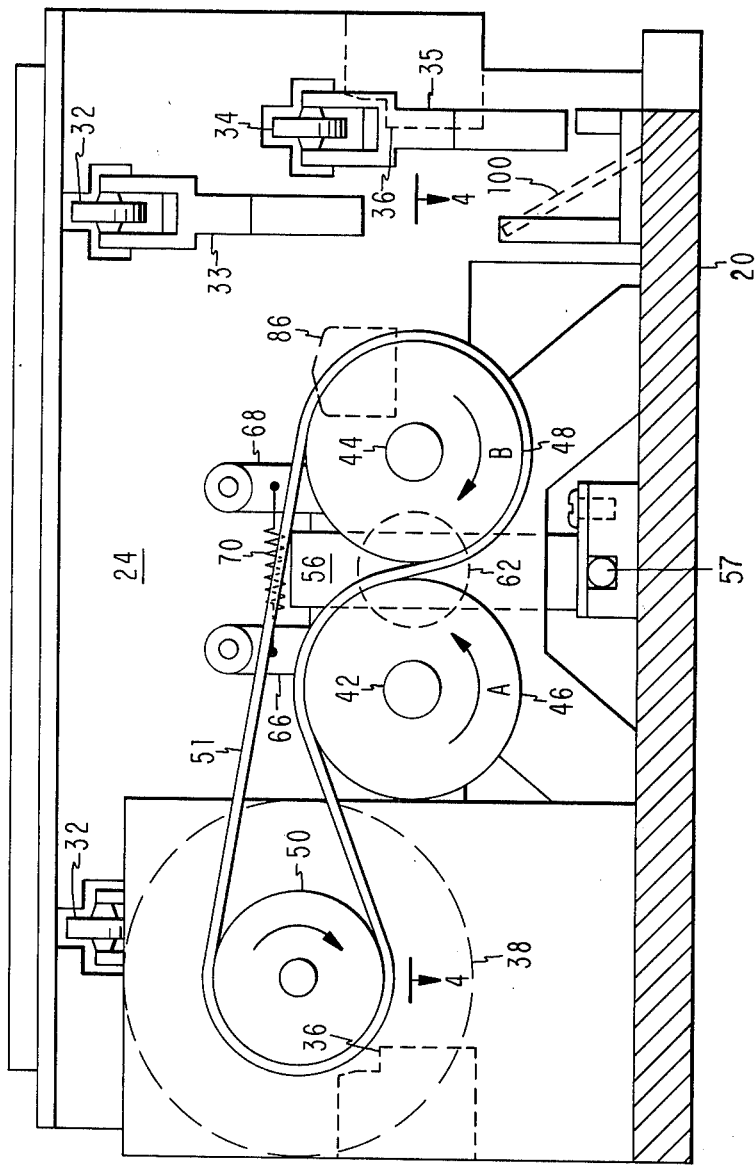
FIG. 3 is a sectional view taken on line 3—3 of FIG. 1.
Figure 4:
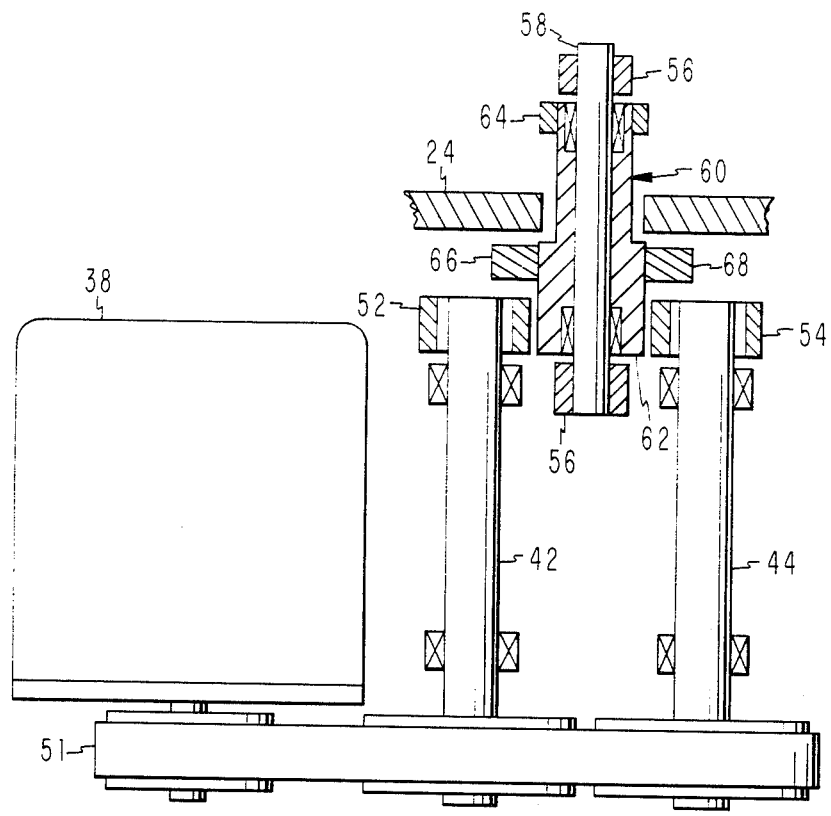
FIG. 4 is a sectional view taken on line 4—4 of FIG. 3.
Figure 9:
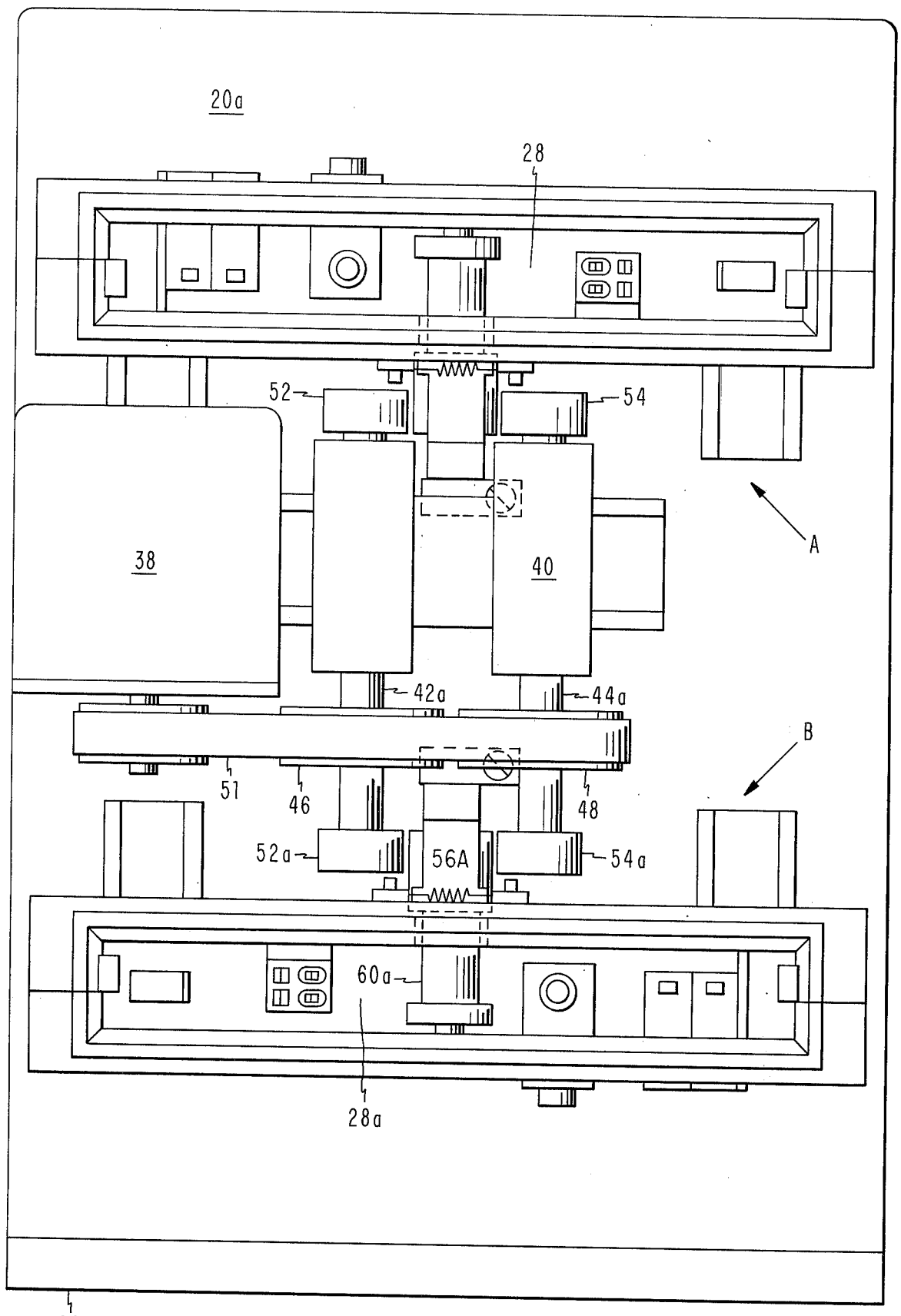
FIG. 9 is a plan view of a modified form of the tape reading and writing machine of the invention.
Figure 10:
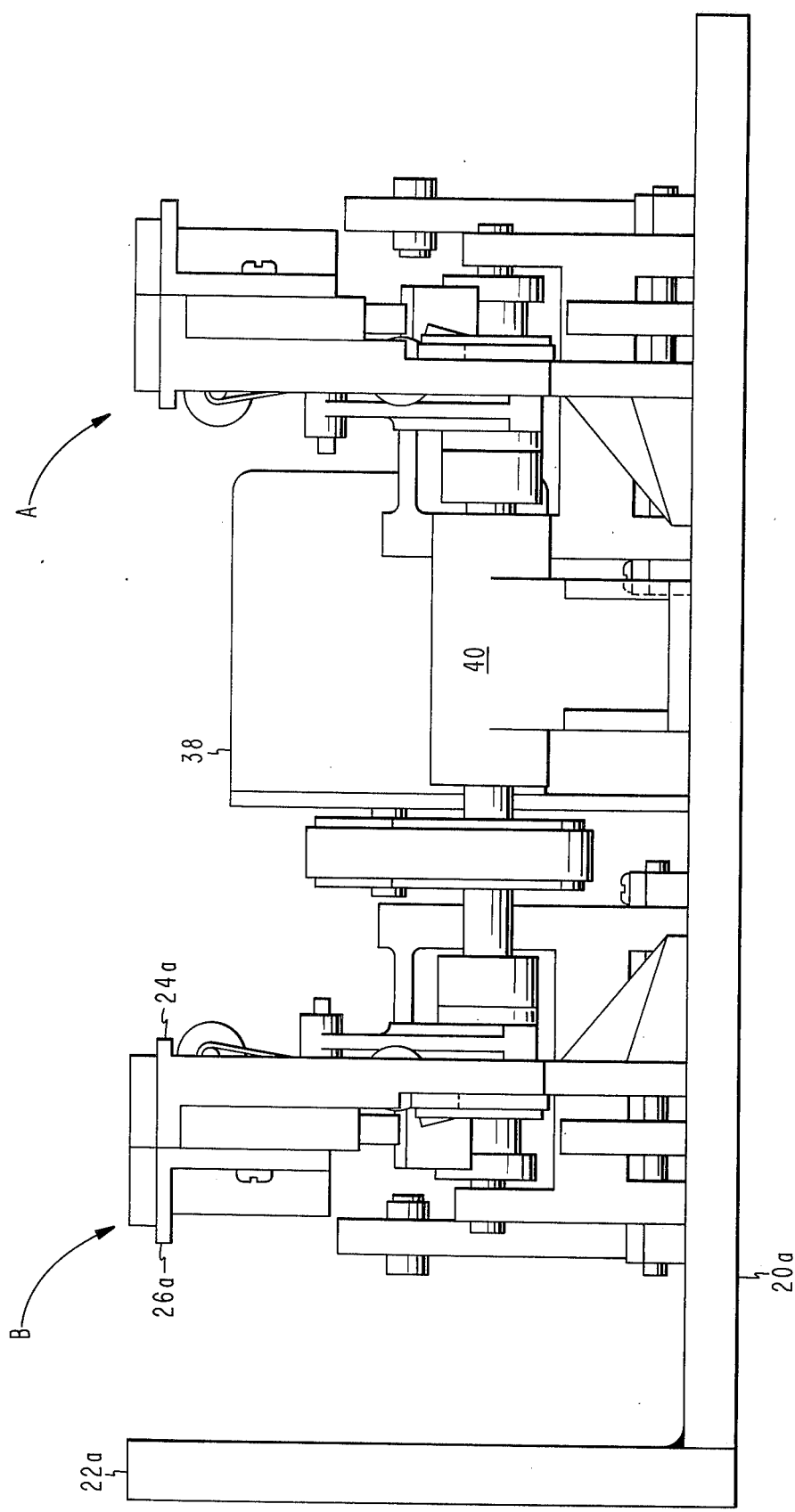
FIG. 10 is a side elevational view of the machine illustrated in FIG. 9.

The embodiment of the invention shown in FIGS. 9 and 10 basically constitutes a doubling of the single cartridge form of the invention shown in FIGS. 1-8, so that two cartridges 30 may be used instead of just one. FIGS. 9 and 10 showing the second form of the invention respectively correspond to FIGS. 1 and 2 showing the first form of the invention. The form of the invention shown in FIGS. 9 and 10 comprises assemblies A and B, and the assembly A is substantially the same as the form of the invention shown in FIGS. 1-8. The assembly B includes a standard 24a and a casing part 26a which together form a slot 28a for receiving a cartridge 30, a pair of drive rolls 52a and 54a, and a swinging member 56a carrying a rotatable member 60a thereon. The journal member 40, the electric motor 38, the belt 51 and the pulleys 46 and 48 of the assembly A are used for driving the assembly B; and these parts therefore are not duplicated for the assembly B. The shafts 42 and 44 have been lengthened to constitute the shafts 42a and 44a of the machine of FIGS. 9 and 10, and the drive rolls 52a and 54a of the assembly B are fixed on the elongate shafts 42a and 44a to be driven thereby. The base 20 has been lengthened to constitute the base 20a, and the base 20a is fixed with respect to the base 22a which is substantially identical with the base 22. The pulleys 46 and 48 driven by the motor 38 in the assembly A are effective to drive the moving parts of the assembly B as well as in the assembly A and in the same manner as has been previously described in connection with the embodiment of the invention of FIGS. 1-8. A cartridge 30 may be placed in the slot 28a of the assembly B at the same time as a cartridge 30 is in the slot 28 of the assembly A, and the form of the invention shown in FIGS. 9 and 10 thus allows two cartridges 30 to be used at the same time.

In the event that it is desired to use the machine of FIGS. 1-8 with the slot 28 being horizontal instead of vertical, the machine is placed on a horizontal support using the base 22. In this case, the base 20 is vertical, and the parts of the machine cooperate together in the same manner as has been previously described. The form of the invention of FIGS. 9 and 10 may also be used with the slots 28 and 28a horizontal. In this jase, the base 22a is placed on a horizontal support, so that the base 20a is vertical.

Advantageously, the arms 66 and 68 function as braking means for the drive roll portion 62 and the rotatable driving member 60 and thus function as braking means for the tape 126 which is in driven relationship with respect to the member 60 due to the roll 64 in engagement with the roller 136. The arms 66 and 68 cooperating with the roll portion 62 thus constitute a relatively simple and inexpensive braking means for the tape 126 by means of which the tape may be quickly stopped after a reading or recording operation has occurred.

We claim:

1. A tape cartridge drive including a frame defining a recess into which a tape cartridge may be inserted, said tape cartridge having a driver roller which when driven drives the tape of the cartridge, a swingable member supported by said frame and carrying a rotatable drive member thereon engaging with said roller when the cartridge is in said recess, a pair of drive rolls carried by said frame, motor means for driving said drive rolls differently from each other, said drive rolls being disposed on opposite sides of said swingable member so that said rotatable drive member engages one or the other of said drive rolls depending on the direction in which said swingable member is swung for thereby driving said tape differently depending on which of the drive rolls is so engaged, a pair of moveable brake members on opposite sides of said swingable member and engaging said rotatable drive member to brake the rotatable drive member and to thereby brake said tape when said swingable member is in a neutral position with said rotatable drive member being out of driving relationship with respect to said pair of drive rolls, and means carried by said swingable member for moving each of said brake members out of braking relationship with respect to said rotatable drive member when said swingable member is swung in the direction toward this brake member to engage said rotatable drive member with one of said pair of drive rolls whereby said brake members are ineffective on said rotatable drive member when said rotatable drive member is being driven.

2. A tape cartridge drive as set forth in claim 1, said pair of moveable brake members constituting a pair of brake arms swingably disposed with respect to said frame on opposite sides of said swingable member.

3. A tape cartridge drive as set forth in claim 1; said pair of moveable brake members constituting a pair of arms swingably disposed with respect to said frame and disposed on opposite sides of said rotatable drive member; the tape cartridge drive including a spring connecting said brake arms tending to bring the arms together and holding them in engagement with said rotatable drive member when said swingable member is in its neutral position; and a stop for each of said brake arms for limiting the swinging movement of the brake arm toward the other brake arm under the action of said spring so that, when said said swingable member and said rotatable drive member are moved away from this brake arm, the rotatable drive member disengages with respect to this brake arm.

4. A tape cartridge drive as set forth in claim 1, said pair of moveable brake members constituting a pair of brake arms swingably disposed with respect to said frame on opposite sides of said swingable member, said motor means for driving said drive rolls including a motor with an output pulley, a pair of pulleys respectively having a driving relationship with said drive rolls, and a belt extending around said pulleys in such a manner that said drive rolls are driven in opposite directions whereby the tape in said cartridge may be moved in opposite directions through the cartridge depending upon which of said drive rolls is engaged by said rotatable drive member.

5. A tape cartridge drive including a frame defining a slot into which a tape cartridge may be inserted, said tape cartridge having a driver roller adjacent the innermost side of the cartridge when inserted into said slot which when driven drives the tape of the cartridge, a swingable support supported by said frame and carrying a rotatable drive member thereon, a driven roll fixed on said drive member and engaging with said roller when the cartridge is in said slot, a pair of drive rolls carried by said frame and having a drive pulley fixed with respect to each of said drive rolls, a motor having an output pulley, an endless belt extending over said pulleys so arranged that said drive rolls are rotated in different directions by means of said motor driving through said belt and pulleys, said drive rolls being disposed on opposite sides of said swingable support so that said rotatable drive member engages with one or the other of said drive rolls depending upon the direction in which said swingable support is swung for thereby driving said tape in opposite directions, a pair of moveable brake arms each swingably disposed with respect to said frame and disposed on opposite sides of said swingable support and engageable with said rotatable drive member, a spring connecting said arms for urging said arms toward each other and into engagement with said rotatable drive member to brake the rotatable drive member and to thereby brake said tape when said swingable support is in a neutral position with said rotatable drive member out of driving relationship with respect to said pair of drive rolls, a stop for limiting the movement of said brake arms under the actuation of said spring, and abutment means carried by said swingable support and effective on each of said brake arms for moving this brake arm out of braking relationship with respect to said rotatable drive member when said swingable support is swung in the direction toward this brake arm to engage said rotatable member with one of said pair of drive rolls whereby this brake arm is out of engagement with said rotatable drive member and said other brake arm is stopped by its stop so as to be out of engagement with said rotatable drive member.

6. A tape cartridge drive including a frame defining a recess into which a tape cartridge may be inserted, said tape cartridge having a driver roller within said recess when the cartridge has been so inserted into the recess which when driven drives the tape of the cartridge, a swingable member supported by said frame and carrying a rotatable drive member thereon engaging with said roller when the cartridge is in said recess, a pair of drive rolls carried by said frame, and motor means for driving said drive rolls differently from each other, said drive rolls being disposed on opposite sides of said swingable member so that said rotatable drive member engages one or the other of said drive rolls depending on the direction in which said swingable member is swung for thereby driving said tape differently depending on which of the drive rolls is so engaged, said motor means including a pair of shafts on which said two drive rolls are mounted, a pulley on one end of each of said shafts, a motor having an output pulley, and a belt extending around said pulleys for driving the pulleys on said two shafts from said motor.

7. A tape cartridge drive including a frame defining a pair of recesses into each of which a tape cartridge may be inserted, each of said tape cartridges having a driver roller within the respective one of said recesses into which the cartridge has been so inserted which when driven drives the tape of the cartridge, first and second swingable members supported by said frame and each carrying a rotatable drive member thereon engageable with one of said rollers with the cartridges being in said recesses, a pair of drive shafts supported by said frame, a pair of drive rolls fixed on adjacent ends of said shafts to position the drive rolls on opposite sides of one of said swingable members so that the rotatable drive member carried thereon is engageable with both of said drive rolls when the swingable member is swung, another pair of drive rolls positioned on the other ends of said shafts and positioned so that when said second swingable member is swung the rotatable drive member thereon engages with the last named pair of drive rolls, a pulley fixed on each of said shafts intermediate said drive rolls carried thereby, a motor having an output pulley, and a belt extending over said pulleys whereby said motor drives said drive rolls.

8. A tape cartridge drive as set forth in claim 7, said belt extending over opposite surfaces of said pulleys fixed on said shafts so as to drive these pulleys and thereby said shafts in opposite directions.

9. A tape cartridge drive including a frame defining a recess into which a tape cartridge may be inserted in place, said tape cartridge having a driver roller at one edge of the cartridge and within said recess when the cartridge is in place, said roller when driven being arranged to drive the tape of the cartridge, a rotatable drive member positioned at the bottom of said recess so as to engage with said roller when the cartridge is in place in the recess, means supporting said rotatable drive member with respect to said frame in such manner that the rotatable drive member may translate toward and away from a side edge of said recess, a drive roll carried by said frame, motor means for driving said drive roll, said drive roll being disposed at the bottom of said recess in such position that said rotatable drive member when moved toward said side edge of said recess engages with the drive roll for thereby driving the tape of said cartridge, and yieldable means carried by said frame and acting on said cartridge for continuously urging said cartridge farther into said recess after the cartridge has been positioned in place in the recess to maintain said roller in continuous driven engagement with said rotatable drive member as said rotatable drive member moves toward said side edge of said recess.

10. A tape cartridge drive including a frame defining a recess into which a tape cartridge may be inserted in place, said tape cartridge having a driver roller at one edge of the cartridge and within said recess when the cartridge is in place, said roller when driven being arranged to drive the tape of the cartridge, a swingable member supported at a pivot point thereof on said frame, a rotatable drive member carried by said swingable member at a point thereon located remotely with respect to said pivot point so that the rotatable drive member moves across said recess with swinging movement of said swingable member, a drive roll carried by said frame, motor means for driving said drive roll, said drive roll being disposed in closed proximity to said swingable member and said rotatable drive member thereon so that said rotatable drive member engages said drive roll when said swingable member is swung toward the drive roll for thereby driving the tape of said cartridge, and yieldable means for continuously urging said cartridge farther into said recess after the cartridge has been positioned in place in the recess to maintain said roller in continuous driven engagement with said rotatable drive member as said drive member moves across said recess with swinging movement of said swingable member.

11. A tape cartridge drive as set forth in claim 10, said means for continuously urging said tape cartridge farther into said recess including a pair of rolls engaging with the edges of a pair of slots formed in opposite side edges of said cartridge and a spring for each of said last mentioned rolls and carried by said frame for urging these rolls farther into their respective slots.

* * * * *

UNITED STATES PATENT AND TRADEMARK OFFICE
CERTIFICATE OF CORRECTION

PATENT NO. : 3,949,951
DATED : April 13, 1976
INVENTOR(S) : Townsend Henry Porter, Jr.
Robert Ellsworth Schopp It is certified that error appears in the above-identified patent and that said Letters Patent are hereby corrected as shown below:

Column 7, line 31, omit "said", second occurrence.
Column 10, line 10, change "closed" to --close--.

Signed and Sealed this

Fourteenth Day of September 1976

[SEAL]

Attest:

RUTH C. MASON
*Attesting Officer*

C. MARSHALL DANN
*Commissioner of Patents and Trademarks*